Oct. 20, 1931. W. T. DAVIS 1,828,031
PLANT PROTECTOR
Filed July 31, 1930
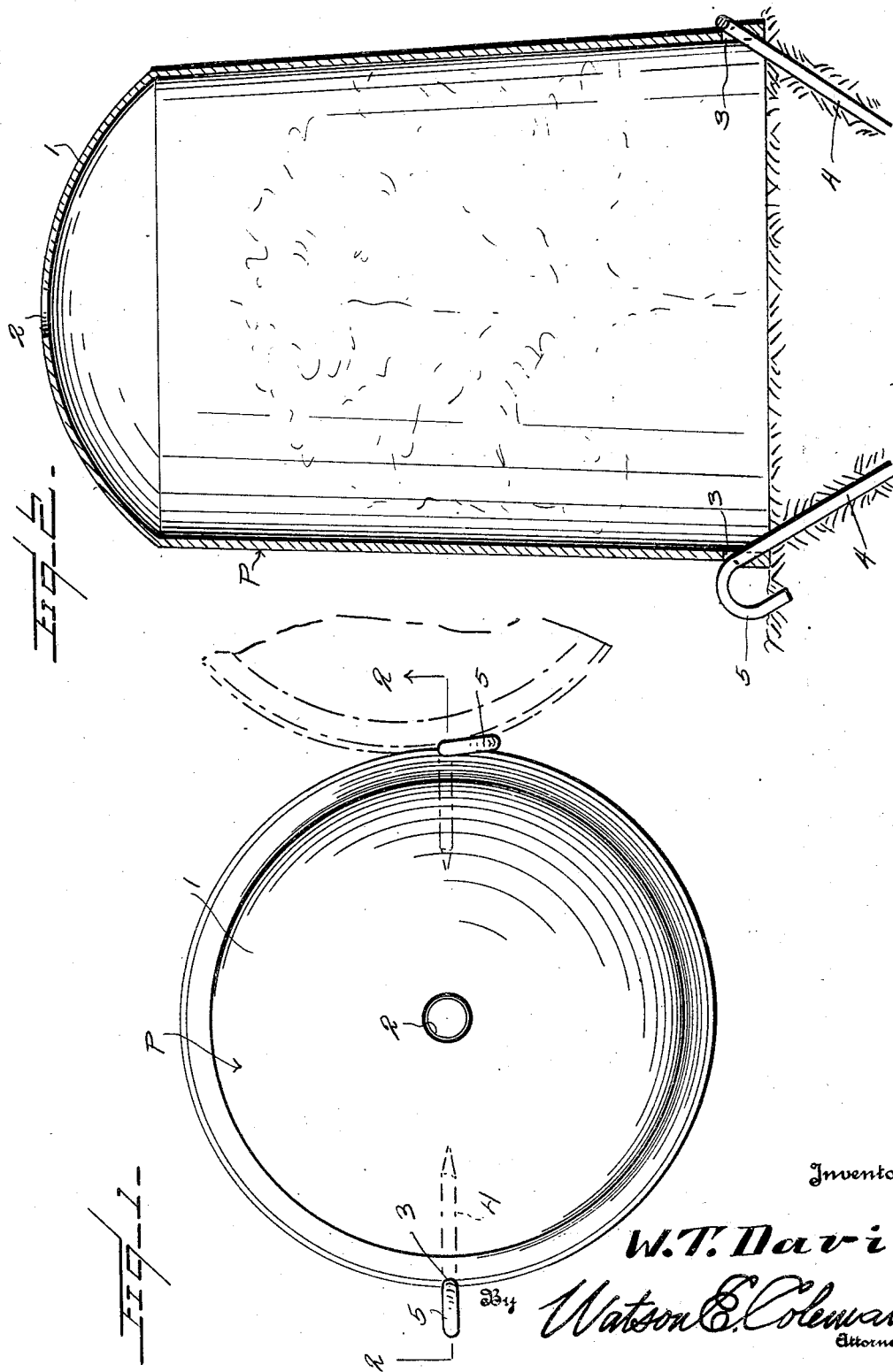

Patented Oct. 20, 1931

1,828,031

UNITED STATES PATENT OFFICE

WALTER T. DAVIS, OF PARKERSBURG, WEST VIRGINIA

PLANT PROTECTOR

Application filed July 31, 1930. Serial No. 472,055.

This invention relates to a plant protector, and it is an object of the invention to provide a device of this kind which is adapted to be disposed over a plant and to be maintained in position with respect thereto by means of pins or the like extending through the lower portion of the protector and penetrating the ground.

It is also an object of the invention to provide a device of this kind which, after being applied, may be readily and conveniently swung into position to one side of the plant and during which operation one of the holding pins serves as a pivot.

Another object of the invention is to provide a device of this kind having a closed end provided with an opening at substantially its axial center, said opening assuring proper circulation of air.

An additional object of the invention is to provide a device of this kind which, when applied, serves to protect a plant against frost and against temperature below freezing.

The invention consists in the details of construction and in the combination and arrangement of the several parts of my improved plant protector whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawings, wherein:—

Figure 1 is a view in top plan of a plant protector constructed in accordance with an embodiment of my invention, a second position of the protector being indicated by broken lines;

Figure 2 is a sectional view taken substantially on the line 2—2 of Figure 1.

As disclosed in the accompanying drawings, P denotes a protector of desired configuration and dimensions and which has a closed upper end 1. This upper end 1 at its axial center is provided with an opening 2 of relatively small diameter and which provides means to assure effective circulation of air through the protector when in applied position, such circulation being further facilitated by the openings 3 provided in the lower portion of the protector P immediately adjacent to its lower open end.

In the present embodiment of my invention, the openings 3 are two in number and diametrically opposed and are adapted to have inserted therethrough the elongated pins 4 whereby the protector is effectively anchored in position over a desired plant. It is to be noted that the outer ends of each of the pins 4 is provided with an inwardly curved lateral arm 5 providing means to facilitate the withdrawal of the pin 4 or to facilitate such pin 4 being used as a pivot when it is desired to swing the protector P into a position to one side of the plant as indicated by broken lines in Figure 1.

In swinging the protector P to one side of the plant as shown in Figure 1, the pin 4 is applied with its curved arm 5 substantially tangential to the lower portion of the protector P.

It is to be noted that each of the openings 3 is in close proximity to the open end of the protector and that each of the curved arms 5 is provided with a bill of a length materially in excess of the space between each of the openings 3 and the adjacent outer edge of the protector. This is of especial importance as it permits the protector, with one of the pins 4 removed of course, being swung along the curved arm 5 to facilitate the application or removal of the protector P with respect to a plant.

From the foregoing description it is thought to be obvious that a plant protector constructed in accordance with my invention is particularly well adapted for use by reason of the convenience and facility with which it may be assembled and operated, and it will also be obvious that my invention is susceptible of some change and modification without departing from the principles and spirit thereof and for this reason I do not wish to be understood as limiting myself to the precise arrangement and formation of the several parts herein shown in carrying out my invention in practice except as hereinafter claimed.

I claim:—

A plant protector having one end closed, said closed end being provided with an opening, the wall of the protector closely adjacent its open end being provided with an opening, and an anchoring pin insertible through said last named opening, said pin at its outer end being provided with a laterally curved arm, said arm having a bill of a length in excess of the distance between the last named opening and the edge of the protector.

In testimony whereof I hereunto affix my signature.

WALTER T. DAVIS.